(12) United States Patent
Sasaki

(10) Patent No.: US 11,704,075 B2
(45) Date of Patent: Jul. 18, 2023

(54) PRINT MANAGEMENT DEVICE AND COMPUTER READABLE MEDIUM

(71) Applicant: FUJIFILM BUSINESS INNOVATION CORP., Tokyo (JP)

(72) Inventor: Kimihiko Sasaki, Yokohama (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 215 days.

(21) Appl. No.: 16/509,976

(22) Filed: Jul. 12, 2019

(65) Prior Publication Data

US 2020/0034085 A1 Jan. 30, 2020

(30) Foreign Application Priority Data

Jul. 25, 2018 (JP) ................................ 2018-139802

(51) Int. Cl.
*G06F 3/12* (2006.01)

(52) U.S. Cl.
CPC .......... *G06F 3/1207* (2013.01); *G06F 3/1232* (2013.01); *G06F 3/1259* (2013.01); *G06F 3/1275* (2013.01)

(58) Field of Classification Search
CPC ...... G06F 3/1275; G06F 3/1259; G06F 3/126; G06F 3/1264; G06F 3/1207; G06F 11/3433; G06F 11/3442; G06F 11/3466
USPC .... 358/1.9, 1.13, 1.16, 1.15; 399/10, 16, 43, 399/44, 79; 709/242
See application file for complete search history.

(56) References Cited

U.S. PATENT DOCUMENTS

| 2002/0102119 A1 | 8/2002 | Christodoulou et al. |
| 2006/0227373 A1* | 10/2006 | Matoba ............ G06Q 10/06313 358/1.15 |
| 2006/0263110 A1* | 11/2006 | Sahay ................... G03G 15/55 399/82 |
| 2010/0073733 A1* | 3/2010 | Hosoi .................. H04N 1/4433 358/448 |
| 2010/0238484 A1* | 9/2010 | Komine ................ G06F 3/1226 358/1.15 |
| 2013/0250329 A1* | 9/2013 | Satoh .................... G06F 3/1291 358/1.13 |
| 2014/0368866 A1* | 12/2014 | Kikumoto ............ G06F 3/1288 358/1.15 |

(Continued)

FOREIGN PATENT DOCUMENTS

| JP | H09-201747 A | 8/1997 |
| JP | 2002-063005 A | 2/2002 |
| JP | 2015-064713 A | 4/2015 |

(Continued)

OTHER PUBLICATIONS

Mar. 5, 2020 Office Action issued in Australian Patent Application No. 2019201612.

(Continued)

*Primary Examiner* — Jamares Q Washington
(74) *Attorney, Agent, or Firm* — Oliff PLC

(57) ABSTRACT

A print management device includes a control unit that performs a control for displaying of information indicating a spare capacity of at least one printing device based on a print plan and a print status of the at least one printing device that is performing printing. The print plan is derived based on capability information of the at least one printing device.

17 Claims, 9 Drawing Sheets

(56) References Cited

U.S. PATENT DOCUMENTS

2015/0062623 A1\*  3/2015  Yano .................... G06F 3/1222
                                                                358/1.15

FOREIGN PATENT DOCUMENTS

| JP | 2017-091223 A | 5/2017 |
| JP | 2018-081594 A | 5/2018 |

OTHER PUBLICATIONS

Jun. 21, 2022 Office Action issued in Japanese Patent Application No. 2018-139802.
Dec. 13, 2022 Office Action issued in Japanese Patent Application No. 2018-139802.

\* cited by examiner

| NAME | VARIABLE | UNIT |
|---|---|---|
| FIRST PRINT SPEED, SECOND PRINT SPEED | PPM1,PPM2 | [SHEET/MINUTE] |
| PLANNED SHEET NUMBER | PPGPL | [SHEET] |
| PRINTED SHEET NUMBER | PPGPF | [SHEET] |
| MEASURED VALUE OF ELAPSED PRINT TIME | TM1 | [MINUTE] |
| STATISTICAL VALUE OF PRINT TIME (TYPE AND SIZE OF SHEET) | TM2 | [MINUTE] |
| OPERATION TIME PER DAY | WTM | [MINUTE] |
| FIRST PRINT TIME, SECOND PRINT TIME | DTM1,DTM2 | [MINUTE] |

|  |  | TEMPERATURE | | | |
|---|---|---|---|---|---|
|  |  | 0 DEGREE ≤ | 10 DEGREE ≤ | 20 DEGREE ≤ | 30 DEGREE ≤ |
| HUMIDITY | ≥ 70% | CONDITION 1 | CONDITION 2 | CONDITION 3 | CONDITION 4 |
|  | ≥ 50% | CONDITION 5 | CONDITION 6 | CONDITION 7 | CONDITION 8 |
|  | ≥ 30% | CONDITION 9 | CONDITION 10 | CONDITION 11 | CONDITION 12 |
|  | ≥ 10% | CONDITION 13 | CONDITION 14 | CONDITION 15 | CONDITION 16 |

| (CONDITION 16) | B5 | Let | A4 | B4 | A3 |
|---|---|---|---|---|---|
| NORMAL PAPER | X1 | X2 | X3 | X4 | X5 |
| EMBOSSED PAPER | X6 | X7 | ... | ... | ... |
| RECYCLED PAPER | ... | ... | ... | ... | ... |
| CUSTOM PAPER | ... | ... | ... | ... | ... |

FIG. 8

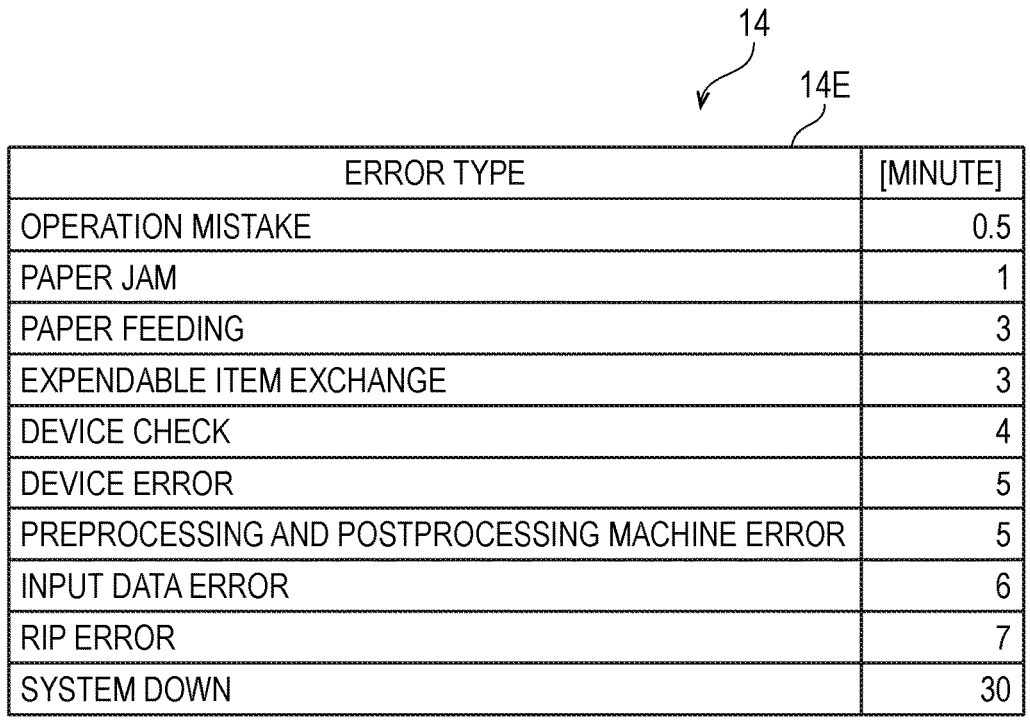

| ERROR TYPE | [MINUTE] |
|---|---|
| OPERATION MISTAKE | 0.5 |
| PAPER JAM | 1 |
| PAPER FEEDING | 3 |
| EXPENDABLE ITEM EXCHANGE | 3 |
| DEVICE CHECK | 4 |
| DEVICE ERROR | 5 |
| PREPROCESSING AND POSTPROCESSING MACHINE ERROR | 5 |
| INPUT DATA ERROR | 6 |
| RIP ERROR | 7 |
| SYSTEM DOWN | 30 |

FIG. 9

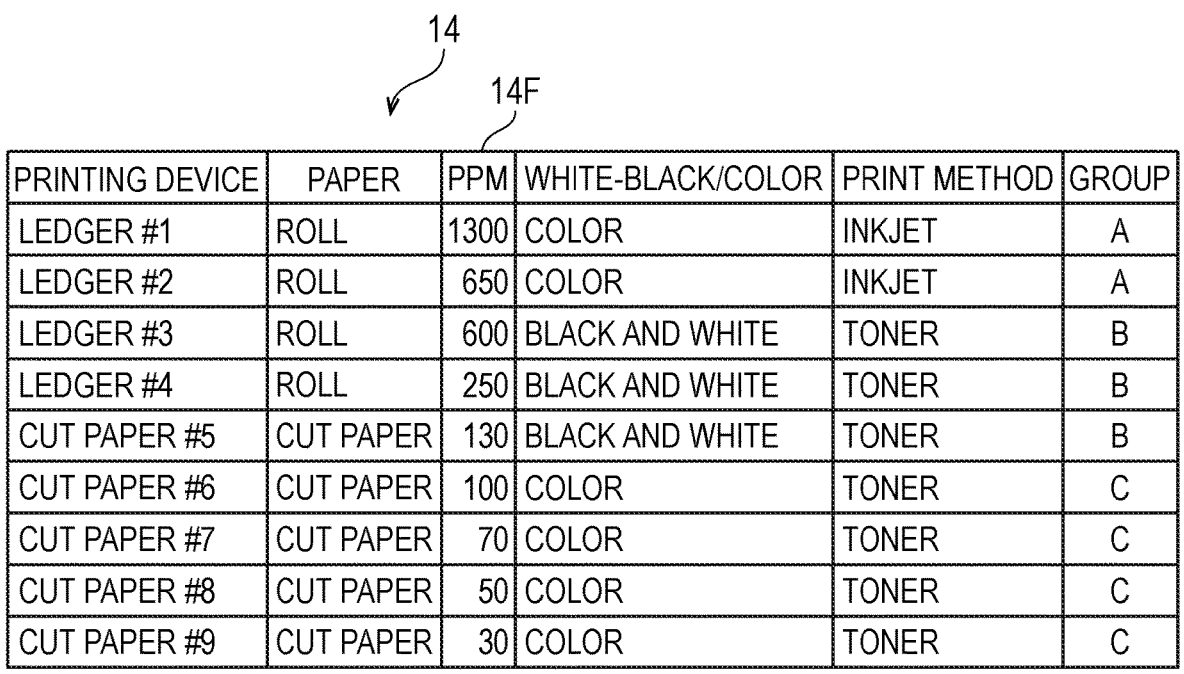

| PRINTING DEVICE | PAPER | PPM | WHITE-BLACK/COLOR | PRINT METHOD | GROUP |
|---|---|---|---|---|---|
| LEDGER #1 | ROLL | 1300 | COLOR | INKJET | A |
| LEDGER #2 | ROLL | 650 | COLOR | INKJET | A |
| LEDGER #3 | ROLL | 600 | BLACK AND WHITE | TONER | B |
| LEDGER #4 | ROLL | 250 | BLACK AND WHITE | TONER | B |
| CUT PAPER #5 | CUT PAPER | 130 | BLACK AND WHITE | TONER | B |
| CUT PAPER #6 | CUT PAPER | 100 | COLOR | TONER | C |
| CUT PAPER #7 | CUT PAPER | 70 | COLOR | TONER | C |
| CUT PAPER #8 | CUT PAPER | 50 | COLOR | TONER | C |
| CUT PAPER #9 | CUT PAPER | 30 | COLOR | TONER | C |

FIG. 11

| PRINTING | STATUS | SCHEDULE | PRODUCT LIST | 2018/07/02 |

XXX #1 — PRINTING DEVICE — IN PRINT — GROUP JOB: 00/00 — NUMBER OF PAGES — 54 % — 540/1000 — SPARE PRODUCTION CAPACITY (PAGE): 1500

XXX #2 — PRINTING DEVICE — IN PRINT — GROUP JOB: 00/00 — NUMBER OF PAGES — 35 % — 420/1200 — SPARE PRODUCTION CAPACITY (PAGE): 1300

XXX #3 — PRINTING DEVICE — CONNECTION ERROR — GROUP JOB: 00/00 — NUMBER OF PAGES — 72 % — 864/1200 — SPARE PRODUCTION CAPACITY (PAGE): 1300

XXX #4 — PRINTING DEVICE — ERROR — GROUP JOB: 00/00 — NUMBER OF PAGES — 45 % — 540/1200 — SPARE PRODUCTION CAPACITY (PAGE): 1300

XXX #5 — PRINTING DEVICE — POWER-OFF — GROUP JOB: 00/00 — NUMBER OF PAGES — -/- % — SPARE PRODUCTION CAPACITY (PAGE): -

XXX #6 — PRINTING DEVICE — IN PRINT — GROUP JOB: 00/00 — NUMBER OF PAGES — 8 % — 80/1000 — SPARE PRODUCTION CAPACITY (PAGE): 1500

XXX #7 — PRINTING DEVICE — IN PRINT — GROUP JOB: 00/00 — NUMBER OF PAGES — 16 % — 80/500 — SPARE PRODUCTION CAPACITY (PAGE): 1500

XXX #8 — PRINTING DEVICE — IN PRINT — GROUP JOB: 00/00 — NUMBER OF PAGES — 27 % — 270/1000 — SPARE PRODUCTION CAPACITY (PAGE): 1500

XXX #9 — PRINTING DEVICE — IN PRINT — GROUP JOB: 00/00 — NUMBER OF PAGES — 54 % — 540/1000 — SPARE PRODUCTION CAPACITY (PAGE): 1500

XXX #10 — PRINTING DEVICE — STANDBY — GROUP JOB: 00/00 — NUMBER OF PAGES — 0 % — 0/1000 — SPARE PRODUCTION CAPACITY (PAGE): 2500

| POST-PROCESSING | STATUS | SCHEDULE | PRODUCT LIST | 2018/07/02 |

YYY #1
POSTPROCESSING DEVICE
IN OPERATION
PRODUCT JOB : 00/00
NUMBER OF BOOKS
54 %
540/1000
SPARE PRODUCTION CAPACITY (BOOK) : 1500
71
72

YYY #2
POSTPROCESSING DEVICE
IN OPERATION
PRODUCT JOB : 00/00
NUMBER OF BOOKS
35 %
420/1200
SPARE PRODUCTION CAPACITY (BOOK) : 1300

YYY #3
POSTPROCESSING DEVICE
CONNECTION ERROR
PRODUCT JOB : 00/00
NUMBER OF BOOKS
72 %
864/1200
SPARE PRODUCTION CAPACITY (BOOK) : 1300

YYY #4
POSTPROCESSING DEVICE
ERROR
PRODUCT JOB : 00/00
NUMBER OF BOOKS
45 %
540/1200
SPARE PRODUCTION CAPACITY (BOOK) : 1300

YYY #5
POSTPROCESSING DEVICE
POWER-OFF
PRODUCT JOB : 00/00
NUMBER OF BOOKS
0 %
0/1000
SPARE PRODUCTION CAPACITY (BOOK) : 2500

YYY #6
POSTPROCESSING DEVICE
IN OPERATION
PRODUCT JOB : 00/00
NUMBER OF BOOKS
8 %
80/1000
SPARE PRODUCTION CAPACITY (BOOK) : 1500

YYY #7
POSTPROCESSING DEVICE
IN OPERATION
PRODUCT JOB : 00/00
NUMBER OF BOOKS
16 %
80/500
SPARE PRODUCTION CAPACITY (BOOK) : 1500

YYY #8
POSTPROCESSING DEVICE
IN OPERATION
PRODUCT JOB : 00/00
NUMBER OF BOOKS
27 %
270/1000
SPARE PRODUCTION CAPACITY (BOOK) : 1500

YYY #9
POSTPROCESSING DEVICE
IN OPERATION
PRODUCT JOB : 00/00
NUMBER OF BOOKS
54 %
540/1000
SPARE PRODUCTION CAPACITY (BOOK) : 1500

YYY #10
POSTPROCESSING DEVICE
STANDBY
PRODUCT JOB : 00/00
NUMBER OF BOOKS
0 %
0/1000
SPARE PRODUCTION CAPACITY (BOOK) : 2500

PRINT MANAGEMENT DEVICE AND COMPUTER READABLE MEDIUM

CROSS-REFERENCE TO RELATED APPLICATIONS

This application is based on and claims priority under 35 USC 119 from Japanese Patent Application No. 2018-139802 filed on Jul. 25, 2018.

BACKGROUND

Technical Field

The present invention relates to a print management device and a computer readable medium.

Related Art

JP-A-9-201747 describes a method of extracting a delay process in a work process allocated to plural machine tools. In the method, the scheduled start time, the scheduled completion time, and the number of scheduled work components of each work process are previously registered in an electronic calculator as plan information, and start time of each work process, a progress status at the current time, completion time (current time in a case where the work process is in a performing state), and the number of work completion components (the number of work completion components up to the current time in a case where the work process is in the performing state) are input to the electronic calculator as achievement information. In the method, when it is necessary to manage the work process, the electronic calculator determines the progress status of each work process, based on the achievement information, and in a case where any one of the work processes is in a completion state, the electronic calculator compares completion time of the process with the scheduled completion time to extract a delay process. Meanwhile, in the method, in a case where any one of the work processes is in the performing state, the electronic calculator calculates the completion prediction time of the process, based on the number of work completion components up to the current time, and electronic calculator compares the prediction time with the scheduled completion time of the work process to extract the delay process.

JP-A-2017-91223 describes an information processing device capable of performing both causing a user to recognize a production achievement based on a production plan and reflecting the production achievement in a profile. The information processing device includes acquisition unit that acquires achievement information relating to work achievement of a predetermined processing process implemented based on a work plan created by using a profile specifying process time of the predetermined processing process. The information processing device includes delay achievement management unit that manages delay achievement information indicating the number of times of work achievements in which delay occurs in comparison with the work plan with respect to the predetermined processing process for N pieces of achievement information acquired by the acquisition unit, and display control unit that displays a new work plan created by using the profile in a display device. The display control unit displays additional information indicating a possibility of a delay in the predetermined processing process with respect to the predetermined processing process included in the new work plan, in a display device, based on the delay achievement information.

SUMMARY

A technique for displaying work completion prediction on a work plan previously generated has been proposed, but there is no technique for grasping a spare production capacity for a print plan of a printing device.

Aspect of non-limiting embodiments of the present disclosure relates to provide a print management device and a computer readable medium that enables grasping of a spare production capacity of a printing device.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a print management device including: a control unit that performs a control for displaying of information indicating a spare capacity of at least one printing device based on a print plan that is derived based on capability information of the at least one printing device and a print status of the at least one printing device that is performing printing.

BRIEF DESCRIPTION OF DRAWINGS

Exemplary embodiment(s) of the present invention will be described in detail based on the following figures, wherein:

FIG. 8 is a diagram illustrating an example of an error coping table according to the exemplary embodiment;

FIG. 9 is a diagram illustrating an example of a device characteristic table according to the exemplary embodiment;

FIG. 11 is a front view illustrating an example of a print management screen according to the exemplary embodiment;

FIG. 13 is a front view illustrating an example of a post-processing management screen according to the exemplary embodiment.

DETAILED DESCRIPTION

Hereinafter, exemplary embodiments of a form for implementing the present invention will be described in detail below with reference to the drawings.

First Exemplary Embodiment

Figure 1:
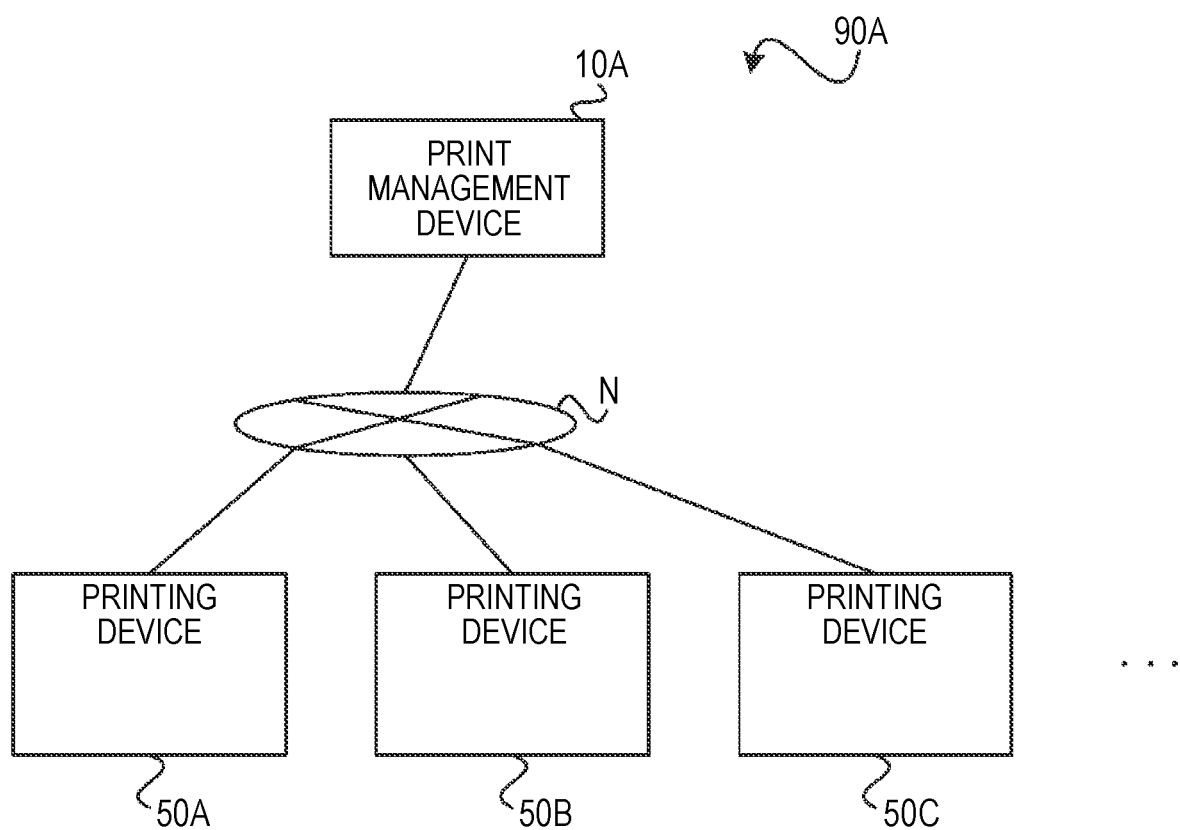
FIG. 1 is a diagram illustrating an example of a configuration of a print management system according to a first exemplary embodiment.

FIG. 1 is a diagram illustrating an example of a configuration of a print management system 90A according to the first exemplary embodiment.

As illustrated in FIG. 1, the print management system 90A according to the present exemplary embodiment includes a print management device 10A and plural printing devices 50A, 50B, 50C, . . . .

For example, a general-purpose computer such as a personal computer (PC) and a portable computer such as a smartphone or a tablet terminal may be used as the print management device 10A according to the present exemplary embodiment. In the present exemplary embodiment, plural printing devices 50A, 50B, 50C, . . . will be described as an example, but only one printing device may be used instead in a same manner.

The print management device 10A according to the present exemplary embodiment is connected to each of plural printing devices 50A, 50B, 50C, . . . via a network N. For example, the Internet, the Local Area Network (LAN), the Wide Area Network (WAN), or the like is employed as the network N. Hereinafter, when it is not necessary to distinguish and describe plural printing devices 50 A, 50 B, 50 C, . . . , separately, the plural printing devices are collectively referred to simply as a printing device 50.

Figure 2:
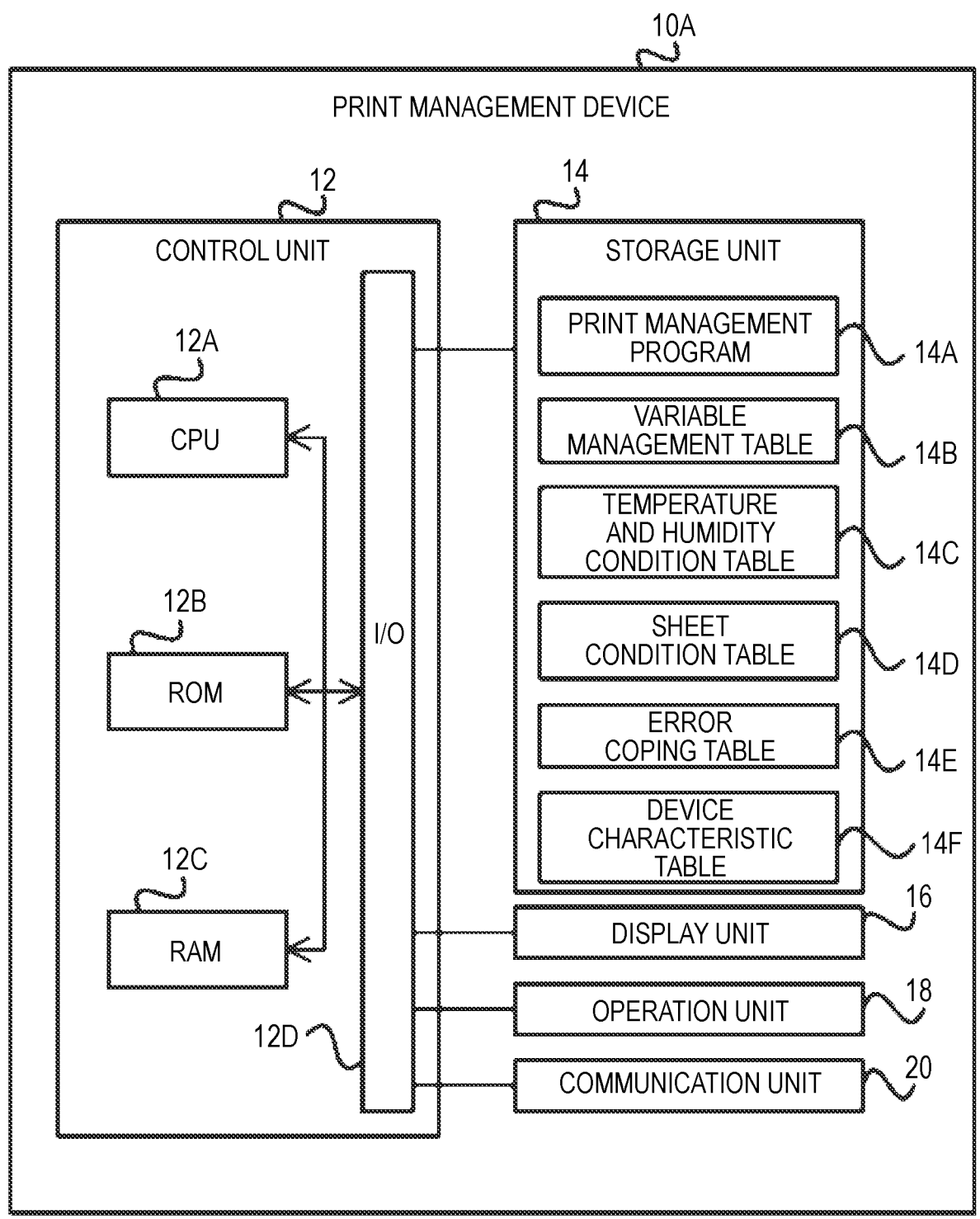
FIG. 2 is a block diagram illustrating an example of an electrical configuration of the print management device according to the first exemplary embodiment.

FIG. 2 is a block diagram illustrating an example of an electrical configuration of the print management device 10A according to the first exemplary embodiment.

As illustrated in FIG. 2, the print management device 10A according to the present exemplary embodiment includes a control unit 12, a storage unit 14, a display unit 16, an operation unit 18, and a communication unit 20.

The control unit 12 includes a central processing unit (CPU) 12A, a read only memory (ROM) 12B, a random access memory (RAM) 12C, and an input/output interface (I/O) 12D.

The I/O 12D is connected to each functional unit including the storage unit 14, the display unit 16, the operation unit 18, and the communication unit 20. The functional units are mutually communicable with the CPU 12A via the I/O 12D.

The control unit 12 may be configured as a sub-control unit that controls an operation a part of the print management device 10A or may be configured as a part of a main control unit that controls an overall operation of the print management device 10A. For example, an integrated circuit such as a large scale integration (LSI) or an integrated circuit (IC) chip set is used for part or all of the respective blocks of the control unit 12. Individual circuits may be used for each of the above-described blocks, or a circuit in which a part or all of the blocks are integrated may be used. The above-described blocks may be provided as one body or a partial block may be provided separately. In addition, in each of the above blocks, a part thereof may be separately provided. Not only LSI but also a dedicated circuit or a general-purpose processor may be used for integration of the control unit 12.

For example, a hard disk drive (HDD), a solid state drive (SSD), a flash memory, or the like is used as the storage unit 14. The storage unit 14 stores a print management program 14A for realizing a print management function according to the present exemplary embodiment. The print management program 14A may be stored in the ROM 12B. In addition, the storage unit 14 stores a variable management table 14B, a temperature and humidity condition table 14C, a sheet condition table 14D, an error coping table 14E, and a device characteristic table 14F.

For example, the print management program 14A may be previously installed in the print management device 10A. The print management program 14A may be realized by being stored in a nonvolatile storage medium, being distributed via a network, and being appropriately installed in the print management device 10A. It is conceivable to use, for example, a compact disc read only memory (CD-ROM), a magneto-optical disk, an HDD, a digital versatile disc read only memory (DVD-ROM), a flash memory, a memory card, and the like as the nonvolatile storage medium.

For example, a liquid crystal display (LCD), an organic electro luminescence (EL) display, or the like is used as the display unit 16. The display unit 16 may integrally include a touch panel. The operation unit 18 is provided with devices for an operation input, such as a keyboard and a mouse. The display unit 16 and the operation unit 18 receive various instructions from a user of the print management device 10A. The display unit 16 displays various kinds of information such as a result of processing performed according to an instruction received from a user and a notification on the processing.

The communication unit 20 is connected to a network N such as the Internet, the LAN, or the WAN, and is communicable with plural printing devices 50 via the network N. The communication via the network N may be a wired communication or a wireless communication.

The print management device 10A according to the present exemplary embodiment performs a display to grasp a production capability for a print plan of the printing device 50.

Figures 3, 4:
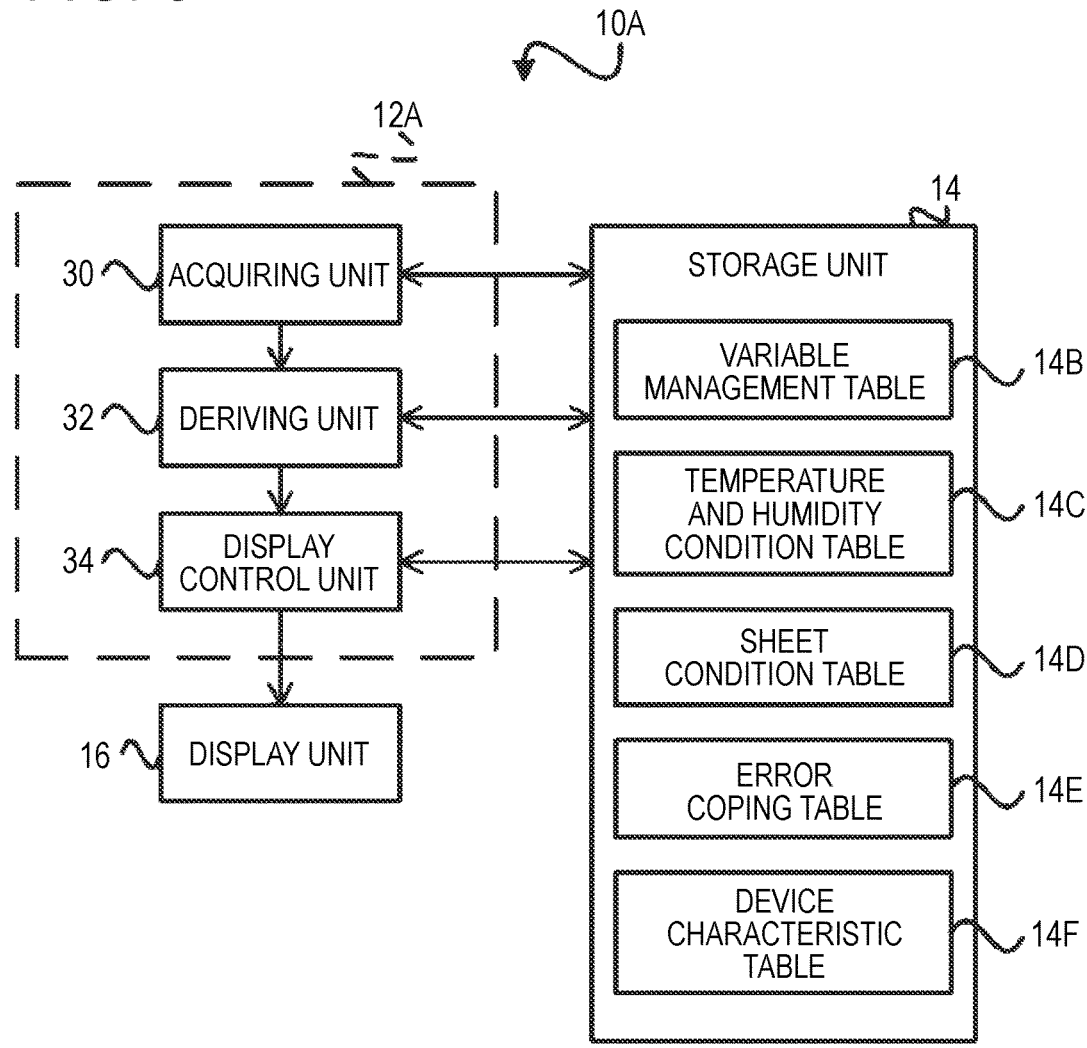
FIG. 3 is a block diagram illustrating an example of a functional configuration of the print management device according to the first exemplary embodiment.
FIG. 4 is a diagram illustrating an example of a variable management table according to the exemplary embodiment.

Accordingly, the CPU 12A of the print management device 10A according to the present exemplary embodiment functions as each unit illustrated in FIG. 3 by writing the print management program 14A stored in the storage unit 14 into the RAM 12C.

FIG. 3 is a block diagram illustrating an example of a functional configuration of the print management device 10A according to the first exemplary embodiment.

As illustrated in FIG. 3, the CPU 12A of the print management device 10A according to the present exemplary embodiment functions as an acquiring unit 30, a deriving unit 32, and a display control unit 34. The display control unit 34 is an example of a control unit.

The acquiring unit 30 according to the present exemplary embodiment acquires capability information of the printing device 50, measurement information such as the printed sheet number, the elapsed print time, and the like from the printing device 50, and stores the capability information, the measurement information, and the like which are acquired in the variable management table 14B. Here, the capability information of the printing device 50 includes a first print speed. The first print speed is one of indicators indicating performance of the printing device 50 and the printing device 50 represents the indicator as the number of printable sheets per unit time. For example, pages per minutes (PPM) (sheets/minute) is applied as a unit of the first print speed. With respect to the number of sheets referred to herein, one printed surface is counted as one sheet, and in a case of duplex print, the one sheet is counted as two sheets because the sheet has two sheet surfaces which are printed.

The deriving unit 32 according to the present exemplary embodiment derives a print plan for the printing device 50 and derives a print status of the printing device 50 that is in actual print. Here, the print plan includes a first print time. The first print time is derived based on a scheduled planned sheet number and the first print speed. For example, a value obtained by dividing the planned sheet number by the first print speed may be used as the first print time. The planned sheet number is the number of print sheets which is previously planned for the printing device 50 and is appropriately set by a user. In addition, the print status includes elapsed print time and a second print time. The elapsed print time is determined according to a printed sheet number out of the planned sheet numbers. The printed sheet number and the elapsed print time are measured constantly or periodically by the printing device 50. The second print time is derived based on the number of remained prints out of the planned sheet number and the second print speed. For example, a value obtained by dividing the number of remained prints by the second print speed may be used as the second print time. The number of remained prints is obtained by subtracting the printed sheet number from the planned sheet number. The second print speed is indicated as the number of sheets per unit time in a case where the printing device 50 is in actual print. For example, the second print speed is obtained by dividing the number of printed sheets by the measured value of the elapsed print time. PPM is used as a unit of the second print speed in the same manner as the first print speed.

FIG. 4 is a diagram illustrating an example of the variable management table 14B according to the present exemplary embodiment.

As illustrated in FIG. 4, the first print speed is referred to as PPM1 and the second print speed is referred to as PPM2. A unit thereof is [sheet/minute]. In addition, the planned sheet number is referred to as PPGPL and the printed sheet number is referred to as PPGPF. A unit thereof is [sheet]. In addition, the measured value of the elapsed print time is referred to as TM1, and a statistical value of the print time (type and size of the sheet) is referred to as TM2 (which will be described below). A unit thereof is [minute]. In addition, an operation time per day of the printing device 50 is previously set, and the operation time is referred to as WTM. A unit thereof is [minute]. In addition, the first print time is referred to as DTM1 and the second print time is referred to as DTM2. A unit thereof is [minute].

Figures 5, 6, 7:
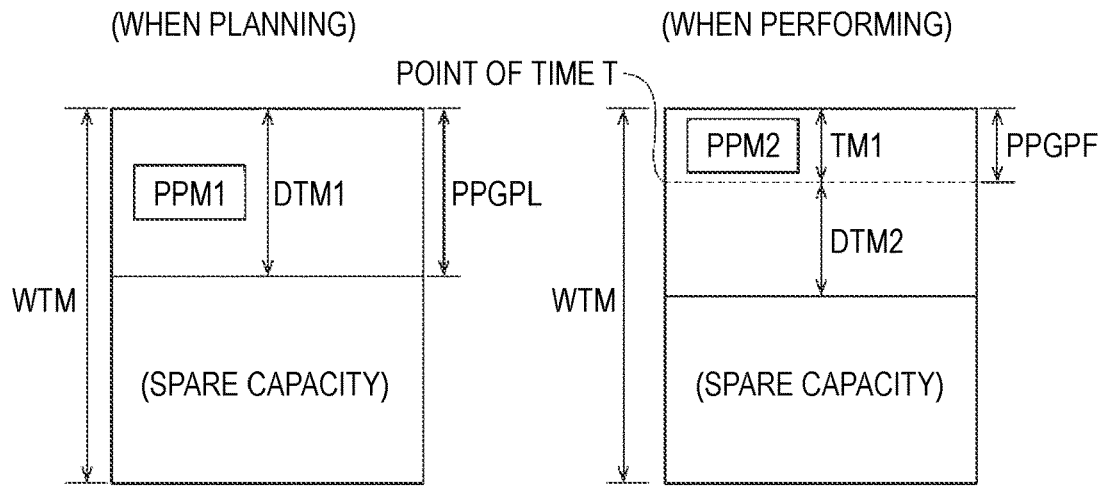
FIG. 5 is a schematic diagram illustrating a correspondence relationship between each variable and a spare capacity according to the exemplary embodiment.
FIG. 6 is a diagram illustrating an example of a temperature and humidity condition table according to the exemplary embodiment.
FIG. 7 is a diagram illustrating an example of a sheet condition table according to the exemplary embodiment.

FIG. 5 is a schematic diagram illustrating a correspondence relationship between each variable and a spare capacity according to the present exemplary embodiment.

A left diagram of FIG. 5 illustrates a correspondence relationship between each variable at the time of planning and the spare capacity, and a right diagram of FIG. 5 illustrates a correspondence relationship between each variable at the time of execution and the spare capacity.

The display control unit 34 according to the present exemplary embodiment performs a control to display information indicating the spare capacity of the printing device 50, based on the print plan and the print status derived from the deriving unit 32.

First, a spare capacity at the time of print plan will be described with reference to FIGS. 4 and 5. The number of maximum printed sheets MPP per day in the printing device 50 is derived from Equation (1).

$$MPP = WTM \times PPM1 \tag{1}$$

Meanwhile, the first print time DTM1 is derived from Equation (2).

$$DTM1 = PPGPL/PPM1 \tag{2}$$

In a case where the spare capacity at this time is represented as time (spare time), the spare time MT is derived from Equation (3).

$$MT = WTM - DTM1 \tag{3}$$

In addition, in a case where the spare capacity is represented as the number of sheets (spare capacity sheet number), the spare capacity sheet number MP is derived from Equation (4).

$$MP = (WTM - DTM1) \times PPM1 \tag{4}$$

The spare time MT and the spare capacity sheet number MP which are derived from above equations are set as initial values at a point of time of plan.

Next, the spare capacity at the time of performing print will be described with reference to FIGS. 4 and 5. PPGPF and TM1 at a point of time T are acquired at a certain point of time T after the printing device 50 start printing. The second print time DTM2 is derived from Equation (5).

$$DTM2 = (PPGPL - PPGPF)/PPM2 \tag{5}$$

Here, PPM2 is derived from Equation (6).

$$PPM2 = PPGPF/TM1 \tag{6}$$

At this time, in a case where PPM1=PPM2, a relationship of Equation (7) is established.

$$TM1 + DTM2 = DTM1 \tag{7}$$

That is, printing is performed as planned, and the spare capacity is displayed as the initial value.

Meanwhile, the display control unit 34 according to the present exemplary embodiment performs a control to update display of information indicating the spare capacity of the printing device 50, based on the first print time, the elapsed print time, and the second print time which are described above. For example, in a case where the total time of the elapsed print time and the second print time is different from the first print time, the display of the information indicating the spare capacity of the printing device 50 is updated. The term "different" described herein means that a difference between the total time and the first print time is greater than or equal to a predetermined time (for example, time longer than or equal to 10 minutes, or the like). In the example of FIG. 5, in a case where (TM1+DTM2) is different from DTM1, the printing is not performed as planned, and the display of the spare capacity is updated.

$$(TM1 + DTM2) > DTM1 \tag{8}$$

Specifically, Equation (8) being satisfied indicates that printing is expected to be completed later than planned.

$$(TM1 + DTM2) < DTM1 \tag{9}$$

Equation (9) being satisfied indicates that printing is expected to be completed earlier than planned. In this case, for example, information indicating the spare capacity of the printing device 50 is represented as a spare capacity sheet number which is obtained by multiplying the spare time obtained by subtracting the total time of the elapsed print time and the second print time from an operation time by the second print speed.

$$MP = \{WTM - (TM1 + DTM2)\} \times PPM2 \tag{10}$$

That is, the spare capacity sheet number MP is derived from Equation (10).

A value obtained by dividing the printed sheet number by a statistical value of the print time according to at least one of a type and a size of a sheet may be adopted as the above-mentioned second print speed. The statistical value of the print time referred to herein corresponds to TM2 illustrated in FIG. 4 described above and is obtained by multiplying the statistical value of the print time per sheet by the printed sheet number. Type of sheet includes, for example, a normal paper, an embossed paper, a recycled paper, a custom paper, and the like. In addition, the size of sheet includes, for example, B5, letter (Let), A4, B4, A3, and the like. For example, for each type of sheet, statistical values may be previously obtained from a set of achieved values of the print time, which is necessary for printing, per sheet. Likewise, the statistical values may be obtained for each size of a sheet or for each type and size of a sheet. For example, an average value, a median value, the most frequent value, or the like is used for the statistical value.

In addition, a value obtained by dividing the printed sheet number by a statistical value of print time according to at least one of the type and the size of a sheet and conditions of temperature and humidity at the time of printing may be adopted as the second print speed.

Here, a form for deriving the second print speed by using the type and size of sheet and the temperature and humidity conditions will be described with reference to FIGS. 6 and 7.

FIG. 6 is a diagram illustrating an example of the temperature and humidity condition table 14C according to the present exemplary embodiment.

In addition, FIG. 7 is a diagram illustrating an example of the sheet condition table 14D according to the present exemplary embodiment.

In the temperature and humidity condition table 14C illustrated in FIG. 6, conditions 1 to 16 are stored in a matrix form in accordance with a temperature and a humidity. By referring to the temperature and humidity condition table 14C, based on the temperature and humidity at the time of printing, any one of the conditions 1 to 16 is selected. Then, the sheet condition table 14D illustrated in FIG. 7 is specified based on the selected condition.

The sheet condition table 14D illustrated in FIG. 7 is provided corresponding to each of the conditions 1 to 16 in the temperature and humidity condition table 14C. Statistical values X1, X2, . . . of the print time per sheet are stored in the sheet condition table 14D, according to the type and size of sheet.

Next, a form in a case where occurrence of an error is detected will be described with reference to FIG. 8.

FIG. 8 is a diagram illustrating an example of the error coping table 14E according to the present exemplary embodiment.

In the error coping table 14E illustrated in FIG. 8, a previously defined time necessary for coping with the error is stored for each type of the error. For example, a statistical value obtained from a set of achieved values of time necessary for coping with the error may be adopted as the previously defined time. The average value, the median value, the most frequent value, and the like are used for the statistical value referred to herein.

In a case where occurrence of an error is detected, the display control unit 34 according to the present exemplary embodiment acquires the time necessary for coping with the error from, for example, the error coping table 14E illustrated in FIG. 8, and performs a control to subtract the acquired time from spare time. The error type illustrated in FIG. 8 includes operation mistake, paper jam, paper feeding, expendable item exchange, device check, a device error, a preprocessing and post-processing machine error, an input data error, a raster image processor (RIP) error, and system down, and the like, and is not limited to these.

Next, a form in a case of plural the printing devices 50 are used will be described with reference to FIG. 9. Plural printing devices 50 are not limited to the printing device of a company itself and may be a form including a printing device of an external contractor.

FIG. 9 is a diagram illustrating an example of the device characteristic table 14F according to the present exemplary embodiment.

The device characteristic table 14F illustrated in FIG. 9 stores characteristic information on each of plural printing devices 50. The characteristic information includes, for example, a sheet, PPM, black and white/color, a print method, and the like. In addition, the printing devices 50 having the same characteristics are grouped. For example, a group A includes the printing device 50 having characteristics that "inkjet" is used as a print method and black and white/color is color. A group B includes the printing device 50 having characteristics that "toner" is used as a print method and black and white/color is black and white. A group C includes the printing device 50 having characteristics that "toner" is used as a print method and black and white/color is color.

The display control unit 34 according to the present exemplary embodiment performs a control to update display of information indicating a spare capacity of each of plural printing devices 50. It is desirable that each of plural printing devices 50 have the same characteristics and belong to the same group. In the device characteristic table 14F illustrated in FIG. 9, for example, in a case where the printing device 50 of "ledger #2" is used and the printing device 50 of "ledger #1" in the same group A is used together, the spare capacity sheet number MP of the two devices is derived from Equation (11).

$$MP = \{WTM - (TM1 + DTM2)\} \times (PPM2 + 1300) \quad (11)$$

However, "1300" indicates a print speed of the printing device 50 of "ledger #1".

In this way, by selecting plural printing devices 50 belonging to the same group as a target of a spare capacity display, a printing device to which additional printing is assigned is easily selected.

Next, an operation of the print management device 10A according to the first exemplary embodiment will be described with reference to FIG. 10.

Figure 10:
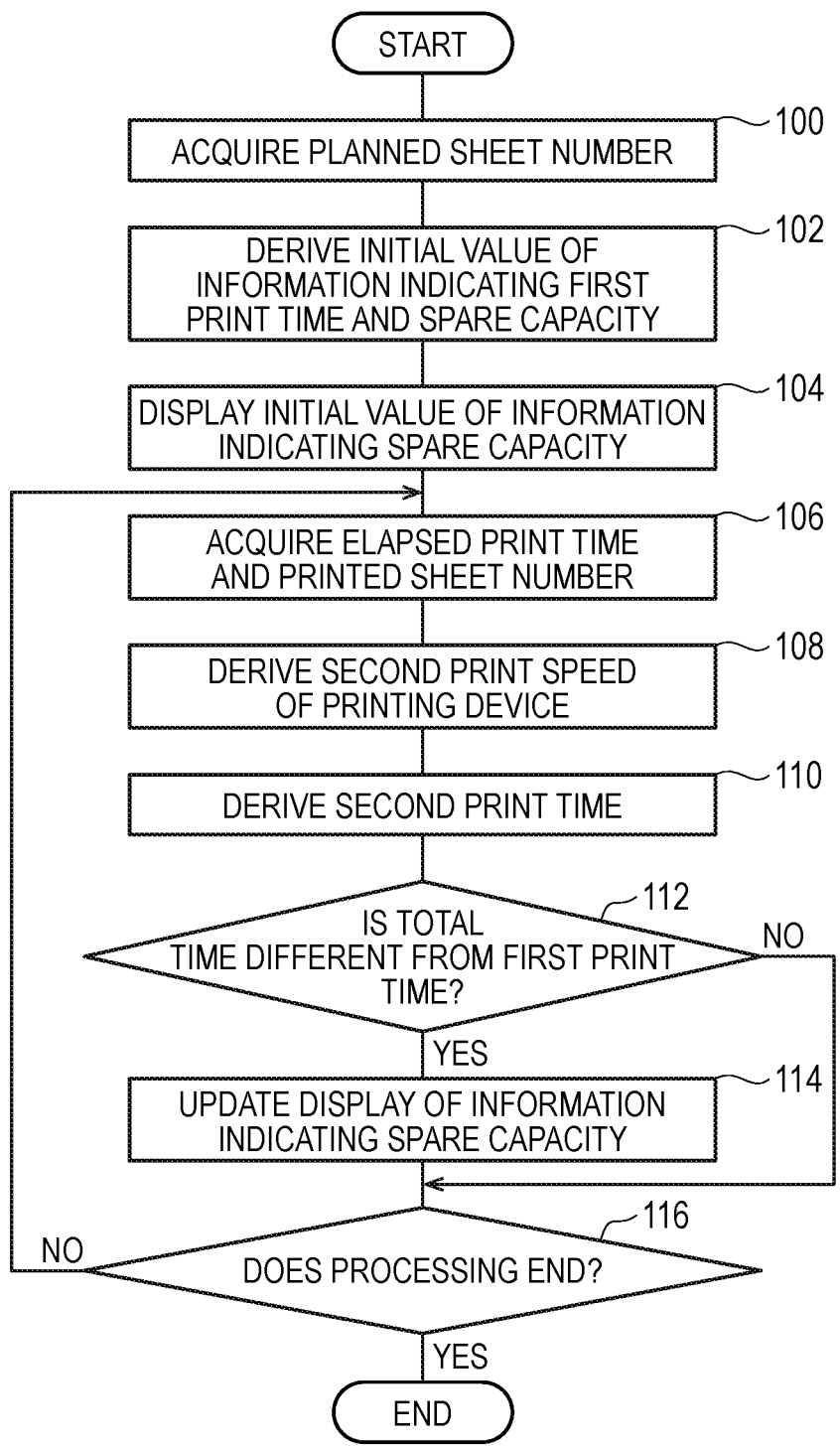
FIG. 10 is a flowchart illustrating an example of a flow of processing performed by a print management program according to the first exemplary embodiment.

FIG. 10 is a flowchart illustrating an example of a flow of processing performed by the print management program 14A according to the first exemplary embodiment.

First, if the print management device 10A is powered to start up, the print management program 14A starts up, and the following steps are performed.

In step 100 of FIG. 10, the acquiring unit 30 acquires the planned sheet number input by a user. The first print speed is previously acquired from the printing device 50 and is stored in the variable management table 14B illustrated in FIG. 4 as an example.

In step 102, the deriving unit 32 derives the first print time based on the planned sheet number and the first print speed. For example, the first print time is derived by dividing the planned sheet number by the first print speed. Furthermore, the deriving unit 32 derives a spare time obtained by subtracting the first print time from an operation time, and a spare capacity sheet number obtained by multiplying the spare time by the first print speed.

In step 104, the display control unit 34 performs a control to cause the display unit 16 to display the spare capacity sheet number derived in step 102 as an initial value of information indicating a spare capacity.

In step 106, the acquiring unit 30 acquires the elapsed print time and the printed sheet number of the printing device 50 from the printing device 50 which is in actual print and stores the acquired elapsed print time and printed sheet number in the variable management table 14B illustrated in FIG. 4 as an example.

In step 108, the deriving unit 32 derives the second print speed of the printing device 50. For example, the second print speed is derived by dividing the printed sheet number by a measured value of the elapsed print time. In addition, the second print speed may be by dividing the printed sheet number by a statistical value of the print time according to at least one of a type and a size of the sheet. In this case, for example, the sheet condition table 14D illustrated in FIG. 7 is used. In addition, the second print speed may be derived by dividing the printed sheet number by a statistical value of the print time according to at least one of the type and the size of the sheet and conditions of a temperature and a humidity at the time of printing. In this case, for example, the temperature and humidity condition table 14C illustrated in FIG. 6 and the sheet condition table 14D illustrated in FIG. 7 are used.

In step 110, the deriving unit 32 derives the second print time, based on the number of remained prints and the second print speed. The number of remained prints is derived by subtracting the printed sheet number from the planned sheet number. For example, the second print time is derived by dividing the number of remained prints by the second print speed.

In step 112, for example, the display control unit 34 determines whether or not the total time of the elapsed print time and the second print time is different from the first print time. In a case where it is determined that the total time is different from the first print time (in a case of a positive determination), the processing proceeds to step 114, and in a case where it is determined that the total time is the same as the first print time (in a case where a negative determination), the processing proceeds to step 116.

In step 114, the display control unit 34 updates display of the information indicating the spare capacity. Specifically, the display is updated as a spare capacity sheet number which is obtained by multiplying the spare time obtained by subtracting the total time (the elapsed print time+the second print time) from the operation time by the second print speed.

In step 116, the display control unit 34 determines whether or not to end processing relating to a print management. In a case where it is determined that the processing relating to the print management is not ended (in the case of a negative determination), the processing returns to step 106 to be repeated. In a case where it is determined that the processing relating to the print management (in the case of a positive determination), a series of processing performed by the print management program 14A ends.

FIG. 11 is a front view illustrating an example of a print management screen according to the present exemplary embodiment.

The print management screen illustrated in FIG. 11 is a screen for displaying a print status of each of plural printing devices 50 managed by the print management device 10A in a list.

For example, the print management device 10A according to the present exemplary embodiment manages the print statuses of plural printing devices 50 of "XXX #1" to "XXX #10" illustrated in FIG. 11. For example, the printing device 50 of "XXX #1" illustrates a state of "in print", and a print status 71 and a spare production capacity 72 are displayed. In the print status 71, the printed sheet number is set to 540 sheets with respect to the planned number of 1,000 sheets. In this case, a progress rate of printing is displayed as 54% (100×540/1,000). Meanwhile, a spare production capacity 72 at this time represents a spare capacity sheet number derived by the above-described method. In this example, 1,500 sheets are displayed. The same print status is displayed for the other printing devices 50. However, the printing device 50 of "XXX #3" illustrates a state of a "connection error", and the printing device 50 of "XXX #4" illustrates a state of an "error". In addition, the printing device 50 of "XXX #5" illustrates a state of "power-off", and the printing device 50 of "XXX #10" illustrates a state of "standby".

As described above, according to the present exemplary embodiment, a spare production capacity of the printing device is grasped. A user may adjust assignment of additional printing while seeing the spare production capacity, and thereby, efficiency of the print processing may be improved.

Second Exemplary Embodiment

In a present exemplary embodiment, a form of displaying information indicating a spare capacity even in a post-processing device connected to the printing device will be described.

Figure 12:
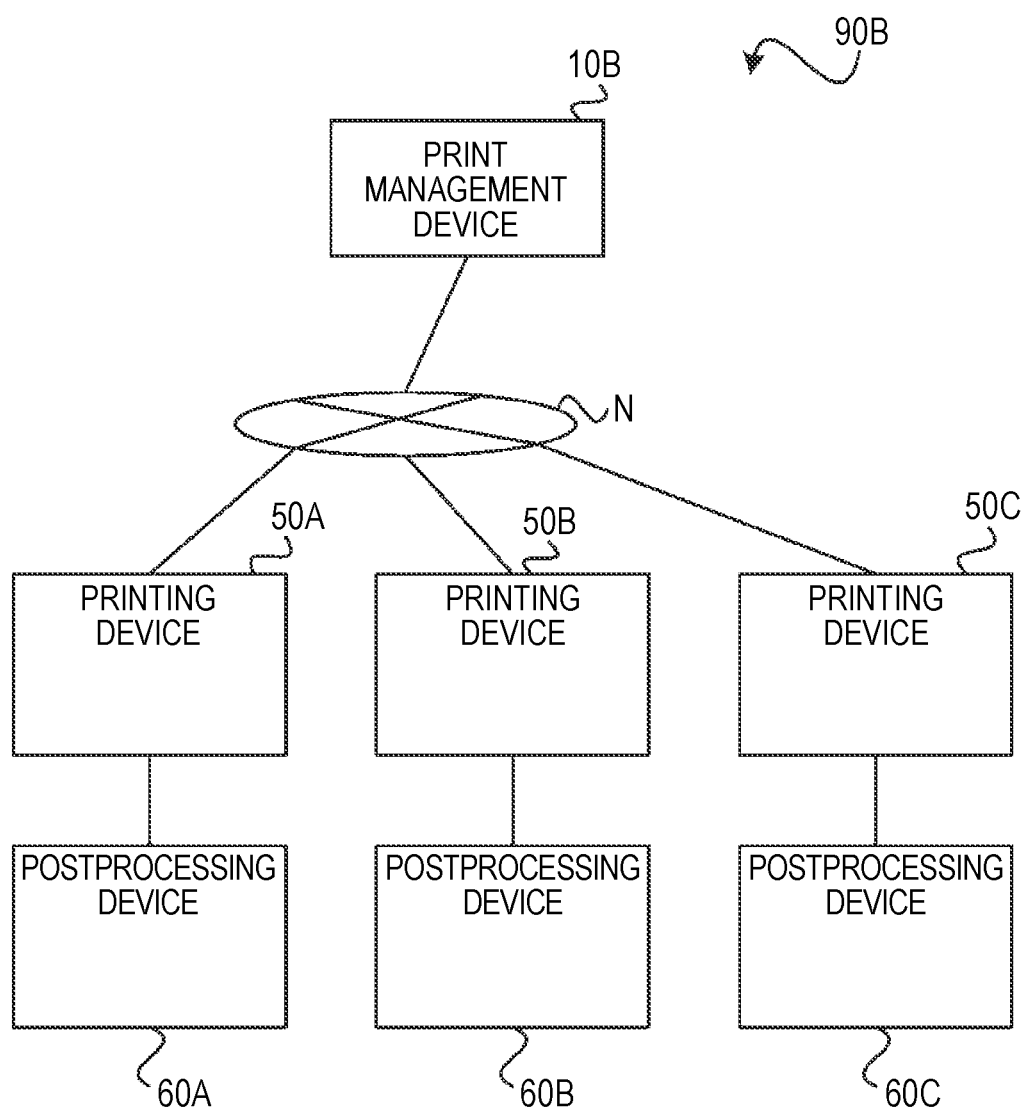
FIG. 12 is a diagram illustrating an example of a configuration of a print management system according to a second exemplary embodiment.

FIG. 12 is a diagram illustrating an example of a configuration of a print management system 90B according to a second exemplary embodiment.

As illustrated in FIG. 12, the print management system 90B according to the present exemplary embodiment includes a print management device 10B, plural printing devices 50A, 50B, 50C, . . . , and plural post-processing devices 60A, 60B, 60C.

The post-processing device 60A according to the present exemplary embodiment is connected to the printing device 50A. Likewise, the post-processing device 60B is connected to the printing device 50B, and the post-processing device 60C is connected to the printing device 50C. Hereinafter, in a case where there is no necessity to distinguish and describe plural post-processing devices 60A, 60B, 60C, . . . , plural post-processing devices are collectively referred to simply as the post-processing device 60. The post-processing device 60 according to the present exemplary embodiment performs various types of post-processing such as binding and cutting for print material produced by the printing device 50.

Next, a functional configuration of the print management device 10B according to the present exemplary embodiment will be described with reference to FIG. 3 described above. The CPU 12A of the print management device 10B according to the present exemplary embodiment functions as the acquiring unit 30, the deriving unit 32, and the display control unit 34 in the same manner as in the first exemplary embodiment.

The acquiring unit 30 according to the present exemplary embodiment acquires capability information of the post-processing device 60, measurement information such as a processed book number and an elapsed processing time, and the like from the post-processing device 60. Here, the capability information of the post-processing device 60 includes the first processing speed. The first processing speed is one of indicators indicating performance of the post-processing device 60 and is illustrated as the number of books per unit time that the post-processing device 60 is processible.

The deriving unit 32 according to the present exemplary embodiment derives a post-processing plan for the post-processing device 60 and derives a post-processing status of the post-processing device 60 which is in actual processing. Here, the post-processing plan includes a first processing time. The first processing time is derived based on a planned book number which is previously determined and the first processing speed. For example, a value obtained by dividing the planned book number by the first processing speed may be applied to the first processing time. The planned book number is the number of books previously planned for the post-processing device 60 and corresponds to the planned sheet number in the printing device 50. In addition, the post-processing status includes the elapsed processing time and the second processing time. The elapsed processing time is time determined according to the processed book number out of the planned book number. The processed book number and the elapsed processing time are constantly or periodically measured by the post-processing device 60. The second processing time is derived based on the number of unprocessed books out of the planned book number and the second processing speed. For example, a value obtained by dividing the number of unprocessed books by the second processing speed may be applied to the second processing time. The number of unprocessed books is obtained by subtracting the processed book number from the planned book number. The second processing speed is represented as the number of books per unit time in a case where the post-processing device 60 actually processes. For example, the second processing speed is obtained by dividing the processed book number by the measured value of the elapsed processing time.

The display control unit 34 according to the present exemplary embodiment performs a control to display information indicating a spare capacity of the post-processing device 60, based on the post-processing plan and the post-processing status derived by the deriving unit 32.

First, the spare capacity at the time of post-processing plan will be described. In the present exemplary embodiment, the first processing speed is referred to as CPM1 and the second processing speed is referred to as CPM2. A unit thereof is [book/minute]. In addition, the planned book number is referred to as CPGPL, and the processed book number is referred to as CPGPF. A unit thereof is [book]. In addition, the measured value of the elapsed processing time is referred to as TM3, the first processing time is referred to as ETM1, the second processing time is referred to as ETM2, and an operation time is referred to as WTM. A unit thereof is [minute].

The number of maximum processed books MPC per day of the post-processing device 60 is derived from Equation (12).

$$MPC = WTM \times CPM1 \tag{12}$$

Meanwhile, the first processing time ETM1 is derived from Equation (13).

$$ETM1 = CPGPL/CPM1 \tag{13}$$

In a case where the spare capacity at this time is represented as time (spare time), the spare time MM is derived from Equation (14).

$$MM = WTM - ETM1 \tag{14}$$

In a case where the spare capacity is represented as the number of books (spare capacity book number). The spare capacity book number MC is derived from Equation (15).

$$MC = (WTM - ETM1) \times CPM1 \tag{15}$$

The derived spare time MM and the derived spare capacity book number MC are set to initial values at the time of planning.

Next, the spare capacity at the time of post-processing will be described. CPGPF and TM3 at a certain time T are acquired at the time T after the post-processing performed by the post-processing device 60 starts. The second processing time ETM2 is derived from Equation (16).

$$ETM2 = (CPGPL - CPGPF)/CPM2 \tag{16}$$

Here, CPM2 is derived from Equation (17).

$$CPM2 = CPGPF/TM3 \tag{17}$$

At this time, in a case where CPM1=CPM2, a relationship of Equation (18) is established.

$$TM3 + ETM2 = ETM1 \tag{18}$$

That is, post-processing is performed as planned, and the spare capacity is displayed as the initial value.

In the same manner as in a case of the first exemplary embodiment, the display control unit 34 performs a control to update the display of information indicating the spare capacity of the post-processing device 60, based on the first processing time, the elapsed processing time, and the second processing time which are described above. For example, in a case where a total time of the elapsed processing time and the second processing time is different from the first processing time, the display of the information indicating the spare capacity of the post-processing device 60 is updated. The term "different" used herein means that a difference between the total time and the first processing time is greater than or equal to a previously determined time (for example, time longer than or equal to 10 minutes). In a case where (TM3+ETM2) is different from ETM1, the post-processing is not performed as planned, and the display of spare capacity is updated.

$$(TM3 + ETM2) > ETM1 \tag{19}$$

Specifically, in a case where Equation (10) is satisfied, Equation (19) indicates that printing is expected to be completed later than planned.

$$(TM3 + ETM2) < ETM1 \tag{20}$$

Meanwhile, in a case where Equation (20) is satisfied, printing is expected to be completed earlier than planned. In this case, for example, the information indicating the spare capacity of the post-processing device 60 is represented as the spare capacity book number which is obtained by multiplying the spare time obtained by subtracting the elapsed processing time and the second processing time from the operation time by the second processing speed.

$$MC = \{WTM - (TM3 + ETM2)\} \times CPM2 \tag{21}$$

That is, the spare capacity book number MC is derived from Equation (21).

A value which is obtained by dividing the processed book number by a statistical value of the processing time according to at least one of a type and a size of a sheet may be adopted as the second processing speed described above. The statistical value of the processing time referred to herein is obtained by multiplying the statistical value of the processing time per sheet by the processed book number. The type of a sheet includes, for example, a normal paper, an embossed paper, a recycled paper, a custom paper, and the like. In addition, the size of sheet includes, for example, B5, letter (Let), A4, B4, A3, and the like. For example, a statistical value may be previously obtained from a set of achieved values of the processing time per sheet, for each type of the sheet. Likewise, the statistical value may be obtained for each size of the sheet, or for each type and each size of the sheet. For example, an average value, a median value, a most frequent value, or the like is applied to the statistical value.

In addition, a value obtained by dividing the processed book number by a statistical value of processing time according to at least one of a type and a size of a sheet and conditions of a temperature and a humidity at the time of printing may be adopted as the second processing speed.

FIG. 13 is a front view illustrating an example of a post-processing management screen according to the present exemplary embodiment.

The post-processing management screen illustrated in FIG. 13 is a screen for displaying a post-processing state of each of plural post-processing devices 60 managed by the print management device 10B, in a list.

For example, the print management device 10B according to the present exemplary embodiment manages post-processing states of plural post-processing devices 60 of "YYY #1" to "YYY #10" illustrated in FIG. 13. For example, the post-processing device 60 of "YYY #1" illustrates a state of "in operation", and a post-processing status 73 and a spare production capacity 74 are displayed. In the post-processing status 73, the processed book number is 540, while the planned book number is 1,000. In this case, a progress rate of post-processing is displayed as 54% (100×540/1,000). Meanwhile, a spare production capacity 74 at this time represents the reserve book number derived by the above-described method. In this example, the spare production capacity is represented as 1,500 books. Likewise, post-processing states for the other post-processing devices 60 are displayed. However, the post-processing device 60 of "YYY #3" illustrates a state of a "connection error", and the post-processing device 60 of "YYY #4" illustrates a state of an "error". In addition, the post-processing device 60 of "YYY #5" illustrates a state of "power-off", and the post-processing device 60 of "YYY #10" illustrates a state of "standby".

As described above, according to the present exemplary embodiment, the spare production capacity of the post-processing device is grasped. A user may adjust assignment of additional post-processing while seeing the spare production capacity, and thereby, efficiency of the post-processing is improved.

As such, the print management device according to the exemplary embodiment is described by way of example. The exemplary embodiment may be provided in a form of a program for causing a computer to perform functions of the respective units included in the print management device. The exemplary embodiment may be in the form of a storage medium readable by a computer that stores this program.

In addition to this, the configuration of the print management device described in the above exemplary embodiments is merely an example, and modification may be made depending on a status within a range without departing from the gist.

In addition, a flow of processing of the program described in the above-described exemplary embodiments is also an example, unnecessary steps may be removed, new steps may be added, or a processing sequence may be exchanged within a range without departing from the gist.

In addition, a case where the processing according to the exemplary embodiment is realized by a software configuration using a computer by executing a program is described in the above exemplary embodiment, and the present invention is not limited to this. The exemplary embodiment may be realized by, for example, a hardware configuration or a combination of the hardware configuration and the software configuration.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A print management device comprising:
a processor programmed to:
generate spare capacity information of at least one printing device based on a print plan, a print status of the at least one printing device that is performing printing, and an operation time of the at least one printing device, the operation time being a preset time per day in which the at least one printing device operates, the print plan being derived based on capability information of the at least one printing device, the spare capacity information indicating how much the at least one printing device can perform printing in addition to the print plan during the operation time, and
perform a control for displaying the spare capacity information in association with an image indicating the at least one printing device on a display screen for displaying the print status of the at least one printing device,
wherein the capability information of the at least one printing device includes a first print speed indicating a number of sheets that the at least one printing device is able to print per unit time,
wherein the print plan includes a first print time that is derived based on a planned sheet number that is determined in advance and the first print speed,
wherein the print status includes
an elapsed print time in accordance with a printed sheet number out of the planned sheet number, and
a second print time that is derived based on a remaining sheet number to be printed out of the planned sheet number and a second print speed indicating a number of sheets that the at least one printing device actually prints per unit time, and
wherein the processor is programmed to perform a control for updating the displaying of the information indicating the spare capacity of the at least one printing device based on the first print time, the elapsed print time, and the second print time,
wherein the second print speed is a value that is obtained by dividing the printed sheet number by a statistical value of print time according to a condition of a temperature and a humidity at a time of printing and at least one of a type and a size of the sheet that is printed by the at least one printing device.

2. A print management device comprising:
a processor programmed to:
  generate spare capacity information of at least one printing device based on a print plan, a print status of the at least one printing device that is performing printing, and an operation time of the at least one printing device, the operation time being a preset time per day in which the at least one printing device operates, the print plan being derived based on capability information of the at least one printing device, the spare capacity information indicating how much the at least one printing device can perform printing in addition to the print plan during the operation time, and
  perform a control for displaying the spare capacity information in association with an image indicating the at least one printing device on a display screen for displaying the print status of the at least one printing device,
wherein the capability information of the at least one printing device includes a first print speed indicating a number of sheets that the at least one printing device is able to print per unit time,
wherein the print plan includes a first print time that is derived based on a planned sheet number that is determined in advance and the first print speed,
wherein the print status includes
  an elapsed print time in accordance with a printed sheet number out of the planned sheet number, and
  a second print time that is derived based on a remaining sheet number to be printed out of the planned sheet number and a second print speed indicating a number of sheets that the at least one printing device actually prints per unit time, and
wherein the processor is programmed to perform a control for updating the displaying of the information indicating the spare capacity of the at least one printing device based on the first print time, the elapsed print time, and the second print time, and
wherein the information indicating the spare capacity of the at least one printing device is represented as a number of sheets that is obtained by multiplying the second print speed by a spare time that is obtained by subtracting the elapsed print time and the second print time from the operation time, the operation time being determined in advance.

3. The print management device according to claim 1,
wherein the information indicating the spare capacity of the at least one printing device is represented as a number of sheets that is obtained by multiplying the second print speed by a spare time that is obtained by subtracting the elapsed print time and the second print time from the operation time, the operation time being determined in advance.

4. The print management device according to claim 2,
wherein, in a case where occurrence of an error is detected, the processor is programmed to further perform a control of subtracting a preset time required for dealing with the error from the spare time.

5. The print management device according to claim 4,
wherein the preset time is based on a statistical value obtained by analysis of records of time needed for dealing with the error at previous occurrences of the error.

6. The print management device according to claim 1,
wherein the at least one printing device includes a plurality of printing devices, and wherein the processor is programmed to further perform a control to update the displaying of the information indicating the spare capacity for each of the plurality of printing devices.

7. The print management device according to claim 6,
wherein the plurality of printing devices have a same characteristic in common.

8. The print management device according to claim 1,
wherein the at least one printing device is connected to a post-processing device, and
wherein the processor is programmed to further perform a control for displaying information indicating a spare capacity of the post-processing device based on a post-processing plan that is derived based on capability information of the post-processing device and a post-processing status of the post-processing device that is performing post-processing.

9. The print management device according to claim 8,
wherein the capability information of the post-processing device includes a first post-processing speed indicating a number of books that the post-processing device is capable of processing per unit time,
wherein the post-processing plan includes a first post-processing time that is derived based on a planned book number that is determined in advance and the first post-processing speed,
wherein the post-processing status includes
  an elapsed post-processing time in accordance with a post-processed book number out of the planned book number, and
  a second post-processing time that is derived based on a remaining number of unprocessed books out of the planned book number and a second post-processing speed indicating a number of books that the post-processing device actually processes per unit time, and
wherein the processor is programmed to further perform a control for updating the display of information indicating the spare capacity of the post-processing device based on the first post-processing time, the elapsed post-processing time, and the second post-processing time.

10. A non-transitory computer readable medium storing a program causing a computer to execute a process for print management, the process comprising:
  generating spare capacity information of at least one printing device based on a print plan, a print status of the at least one printing device that is performing printing, and an operation time of the at least one printing device, the operation time being a preset time per day in which the at least one printing device operates, the print plan being derived based on capability information of the at least one printing device, the spare capacity information indicating how much the at least one printing device can perform printing in addition to the print plan during the operation time, and
  performing a control for displaying the spare capacity information in association with an image indicating the at least one printing device on a display screen for displaying the print status of the at least one printing device,
  wherein the capability information of the at least one printing device includes a first print speed indicating a number of sheets that the at least one printing device is able to print per unit time, wherein the print plan includes a first print time that is derived based on a planned sheet number that is determined in advance and the first print speed, wherein the print status includes
- an elapsed print time in accordance with a printed sheet number out of the planned sheet number, and
- a second print time that is derived based on a remaining sheet number to be printed out of the planned sheet number and a second print speed indicating a number of sheets that the at least one printing device actually prints per unit time, and wherein the computer is programmed to perform a control for updating the displaying of the information indicating the spare capacity of the at least one printing device based on the first print time, the elapsed print time, and the second print time, wherein the information indicating the spare capacity of the at least one printing device is represented as a number of sheets that is obtained by multiplying the second print speed by a spare time that is obtained by subtracting the elapsed print time and the second print time from the operation time, the operation time being determined in advance.

11. The print management device according to claim 1, wherein the spare capacity information quantitatively indicates how much the at least one printing device can perform printing in addition to the print plan during the operation time.

12. The print management device according to claim 2, wherein the second print speed is a value that is obtained by dividing the printed sheet number by a measured value of the elapsed print time.

13. The print management device according to claim 2, wherein the second print speed is a value that is obtained by dividing the printed sheet number by a statistical value of a print time according to at least one of a type and a size of a sheet that is printed by the at least one printing device.

14. The print management device according to claim 2, wherein the at least one printing device includes a plurality of printing devices, and wherein the processor is programmed to further perform a control to update the displaying of the information indicating the spare capacity for each of the plurality of printing devices.

15. The print management device according to claim 14, wherein the plurality of printing devices have a same characteristic in common.

16. The print management device according to claim 2, wherein the at least one printing device is connected to a post-processing device, and wherein the processor is programmed to further perform a control for displaying information indicating a spare capacity of the post-processing device based on a post-processing plan that is derived based on capability information of the post-processing device and a post-processing status of the post-processing device that is performing post-processing.

17. The print management device according to claim 16, wherein the capability information of the post-processing device includes a first post-processing speed indicating a number of books that the post-processing device is capable of processing per unit time, wherein the post-processing plan includes a first post-processing time that is derived based on a planned book number that is determined in advance and the first post-processing speed, wherein the post-processing status includes
- an elapsed post-processing time in accordance with a post-processed book number out of the planned book number, and
- a second post-processing time that is derived based on a remaining number of unprocessed books out of the planned book number and a second post-processing speed indicating a number of books that the post-processing device actually processes per unit time, and wherein the processor is programmed to further perform a control for updating the display of information indicating the spare capacity of the post-processing device based on the first post-processing time, the elapsed post-processing time, and the second post-processing time.

* * * * *